United States Patent Office 2,984,578
Patented May 16, 1961

2,984,578
METHODS OF MAKING A LIGNOCELLULOSE PRODUCT AND PRODUCTS RESULTING THEREFROM

William T. Glab, Dubuque, Iowa, assignor, by mesne assignments, to Durel Incorporated, Dubuque, Iowa, a corporation of Iowa No Drawing. Filed Sept. 30, 1958, Ser. No. 764,232

3 Claims. (Cl. 106—163)

This invention relates to methods of making a lignocellulose product and to the products resulting therefrom.

This application is a continuation-in-part of my copending application, Serial No. 443,711, filed July 15, 1954, now U.S. Patent No. 2,864,715.

It is an object of this invention to provide an improved method of making a moldable composition comprising reacting an essentially dry mixture including comminuted lignocellulose and a reactant including formaldehyde while confining the mixture of lignocellulose and reactant under superatmospheric pressure.

Another object of this invention is to provide such a method wherein the reaction is conducted in an atmosphere of steam at about 300–500° F. for about 4–60 minutes.

A further object of the invention is to provide lignocellulose products prepared by the above methods.

Other objects and advantages of the invention will be apparent from the following description of several embodiments of the invention.

An important advantage of the invention appears to be the controlling of the reaction so that the alpha cellulose is reduced in molecular size sufficiently to prevent swelling of subsequently fabricated products but not to the extent that toughness of fibre is lost. This latter occurs under drastic degradation and starts to become quite serious when approximately 25% of the lignocellulose has been lost as either gaseous or soluble by-products.

Another advantage appears to be the plasticization of the lignin component during the controlled cellulose degradation so that the lignin can subsequently be made to flow and function as a binder between the comminuted lignocellulose particles.

Another advantage is the provision of a relatively dry system so that high capacity for the processing of, for example, wood waste is attained. This is not possible in a wet process such as ordinarily found in a pulping process in which the reactor is charged with approximately 90% water which takes up space as well as requires the addition of large amounts of energy to bring the reaction medium to the proper temperature.

Another advantage is the contacting of lignocellulose or dry mixes of lignocellulose and other ingredients under superatmospheric pressure with a vapor or combination of vapors functioning both as a heat transfer medium and as a reactant.

In the method of this invention an essentially dry mixture including comminuted lignocellulose and a reactant including formaldehyde is reacted as by heating while confining the lignocellulose and the reactant under superatmospheric pressure as in an autoclave. During the reaction the lignocellulose bond is apparently broken and the lignin is released to operate as a binder.

It appears that the hemicelluloses are the primary constituents of the lignocellulose which are attacked by hydrolysis, but that under the high pressure and temperature of this invention a portion of the hydrolysates are further converted to higher molecular weight materials which can function as plasticizers for the autoclave product when it is molded. At the same time a controlled degradation of the alpha cellulose is carried out to the extent that the desired degree of moisture stability is obtained in the molded or extruded products without an unnecessary loss of toughness. These actions are believed to occur although they have not been absolutely proven.

The methods of this invention may be carried out batchwise in an autoclave or a sealed press or continuously in a continuous contactor.

The lignocellulose which appears dry to the touch actually contains up to about 30% water before the reaction begins.

The lignocellulose which may be used in this invention includes wood as well as other lignocellulosic vegetable materials. The lignocellulose is finely divided so that the particles are preferably not more than 20 mesh in size as measured by a standard screen although smaller sizes are preferred.

During the reaction which takes place in a confined atmosphere under superatmospheric pressure various reaction products are produced although the exact nature of the reactions is not understood. It appears that the reaction products are either inert so that the product iself is inert, have a binding action such as is true of the lignin produced, are gaseous by-products, or are polymerized. By hydrolyzing and partially removing, or polymerizing the hemicelluloses to lignin type materials, the ratio of lignin and other binders to the alpha-cellulose is increased so that the general nature of the lignocellulose mixture is drastically changed.

The high pressure method of this invention has a number of advantages that are not possible with reactions taking place at ordinary pressures and in an unconfined state. In the preferred process, steam is introduced into the autoclave both for heating purposes and to supply moisture for the reaction. In the high pressure method of this invention heat transfer is much more rapid so that in general a shorter reaction time is required. Furthermore, energy losses during the reaction are greatly reduced. In the ordinary reacting mixture these energy losses result from the release of volatile materials such as water vapor, gaseous reaction by-products and the like. As the reaction here takes place in a confined atmosphere, no such losses occur to any material degree. Furthermore, the energy supplied by the steam or vapor is utilized to heat only the lignocellulose with its approximately normal moisture content in contrast to pulping type reactions where large quantities of water are present, requiring far greater expenditures of energy.

Another important advantage of this process is the close control that is obtained over the reaction. Thus the temperature of the reacting mass, and hence the rate of reaction, can be easily raised or lowered by controlling the rate of flow, pressure and the temperature of the heat transfer medium which may be steam, oil vapor, or other high temperature fluids. Reactions may easily be stopped by flashing the heat transfer medium from the autoclave since the large energy loss on expansion cools the reacting mass below the incipient reaction point. During the practice of the process the reacting mixture may be confined in a jacketed vessel with the heating medium introduced to the chambers in the quantity and temperature desired.

A very important advantage of the invention is that volatile reactants may be used as the reacting mass is in a confined space. Volatile reactants are impossible, of course, when the reacting mass is in the open. As a result of the rapid heat transfer achieved by this invention and the penetration of volatile reactants the reaction not only proceeds to completion in a much shorter time but the final product tends to be more uniform than where the reactants are heated such as in an ordinary process that depends upon surface temperautre differentials.

Tests have shown that the confining of the reacting mass in the autoclave not only causes retention of the by-products of reaction within the mass even when the by-products are gaseous but also causes polymerization of all or a portion of these by-products, even some that are gaseous. In so-called wet processes large quantities of the by-products of reaction go into solution and are lost.

Another advantage of the invention is that the volatile by-products are easily collected and removed at low cost for later use where desired or to prevent the creation of a nuisance.

Where volatile reactants are used in conjunction with the formaldehyde no mechanical mixing of the ingredients is required. This results in a considerable saving in time, labor and other factors. Thus, in these instances, it is only necessary to charge the reactor with the lignocellulose and introduce the volatile materials into the reactor under superatmospheric pressure. In addition, if desired, the reactants can be changed or modified during the course of a run. This is not possible to such a degree in a wet process where the charge generally contains less than 50% of lignocellulose, and addition of reactants would in many cases cause prohibitive amounts to go into solution.

A further advantage of utilizing a vapor process is that the volatile content of the reaction product which is primarily moisture can be controlled. By using superheated steam with a sufficient degree of superheat, products on the order of 1% or lower volatile content can be obtained. Under normal condition, 10 to 15 degrees of superheat at 300 pounds per square inch steam pressure will produce a product of 3–5% volatile content. Thus, the expensive drying step connected with wet processes can be avoided.

Because of rapid penetration of reactants under high pressure, larger sized particles can be charged to the autoclave than would ordinarily be used, and a savings in size reduction cost made as a result of lower power requirements to reduce the treated material in comparison with raw lignocellulose.

In addition, where flat stock or preformed material is being made as in a sealed press, the products can be made much thicker and more uniform than in an ordinary press which depends upon high platen temperatures for heat transfer, and in many cases requires almost prohibitive cycle times.

The products of the reactions of this invention may be finished shaped materials or moldable compositions that may be used to make molded products. Where the product is molded after the reaction, this product is preferably removed from the reaction vessel and then ground to a fine powder that is preferably not over 50 mesh in size. The finely divided moldable material is heated to a temperature just sufficient to cause the material to flow and fill the mold under the pressure used. This temperature is kept sufficiently low, however, that losses are minor and breakdown due to decomposition is kept to a minimum. The preferred temperature is between 250–400° F.

The molding pressure may be any pressure sufficient to cause the material to fill completely the mold and will vary depending upon the shape of the mold, the nature of the moldable material and other factors. In the preferred process to produce high density materials this pressure is between 2,000–10,000 pounds per square inch. The molding time is only sufficient to cause the moldable material to fill the mold and set, and again will vary depending upon the type of mold being used, the temperature, the nature of the moldable material and similar factors. In general, the molding time will vary between 0.2–15 minutes.

The flow of the moldable material of this invention is improved and a shorter time is required if a plasticizer is added.

Plasticizers in general which have been found to be effective with the moldable materials include water; aromatic compounds containing a hydroxyl group such as aniline, phenol and cresol, alcohols such as benzyl, diethyleneglycol, glycerol, and furfuryl; nitrogen compounds such as formamide, urea, pyridine, and triethanolamine; and furfural.

The preferred plasticizers are water, furfural, aniline and phenol and the quantity utilized may vary depending on the flow desired. The preferred quantity is between about 2–20%.

In particular, the choice of plasticizer will depend upon the end use or method of fabrication of the material. The reaction products themselves are of a slow thermosetting nature. Thus, if a plasticizer such as water which is incapable of thermoset is used, the material is essentially of a thermoplastic nature. This is also true of the preferred plasticizers as a group; however, when desired, thermoset compositions can be made by using furfural, aniline or phenol in conjunction with a catalyst and, if desired, other materials capable of copolymerization.

Materials which will function as catalysts include the oxides, hydroxides and carbonates of the alkali and alkaline earth metals. The preferred catalysts are the oxides of magnesium and zinc.

Among the materials which may be used with the thermosetting plasticizers as copolymers are hexamethylene tetramine, dimethylolurea, paraformaldehyde and urea.

Depending upon the set time required, about .05–5.0% of the catalyst and about 0.5–10% of the copolymer are used.

If desired, thermoset products can be obtained without the use of catalysts or copolymers merely by heat treating the fabricated products after they have been molded or extruded.

If desired, products of density ranging from 0.2–1.3 specific gravity may be produced in the high pressure reacting vessel itself without requiring a subsequent molding operation as described above with high pressure molding. Here the finely divided lignocellulose and the reactant are mixed and the mixture cold pressed into the desired shape or compacted in a sealed press. The compressed mixture is then heated in the press or other high pressure vessel for the time required, at the required temperature and pressure. The material when removed from the reaction vessel will then be found to be quite hard and strong. In these instances, the reactant may be any of those set out above.

The preferred amount of formaldehyde varies between about 0.5–15% by weight of the lignocellulose. The preferred amounts of various additives that may be used with formaldehyde are shown in the following table:

| Additive: | | Preferred amount |
|---|---|---|
| Sulfuric acid | percent | 0.1–5 |
| Oxalic acid | do | 0.1–8 |
| Ammonium hydroxide | do | 1.0–15 |
| Vinsol | do | 2.0–30 |
| Cresol | do | 2.0–25 |
| Sulfur | do | 1.0–20 |
| Phenol residue | do | 2.0–30 |
| Sodium hydroxide | do | 0.1–5 |
| Sulfur dioxide | p.s.i. gauge [1] | 2–50 |
| Aluminum chloride | percent | 0.1–10 |
| Ferric chloride | do | 0.5–10 |
| Phosphoric acid | do | 0.1–20 |
| Calcium chloride | do | 1.0–10 |

[1] P.s.i. is pounds per square inch.

Steam may or may not be supplied to the reaction vessel depending upon the result desired. If steam is used, it is preferably supplied at 100–1000 pounds per square inch pressure and at a temperature of 400–550° F. In the event that a sealed press is used, the normal moisture content of the wood as well as the reaction by-products may be used to build up to a predetermined pressure which can be maintained constant by venting the excess vapors produced. This pressure is preferably between 100–600 pounds per square inch. Such a procedure eliminates the blow-ups encountered in treating wood in an ordinary hot press at high temperatures, as well as drastically reducing press time, and polymerizes a percentage of the gaseous and low molecular weight by-products to resinous-like materials which function as binders for lignocellulose particles. If desired, a two step process may be used in which the first step includes the pressure treatment and the second step includes venting the vapors to atmospheric pressure followed by a 2–10 minute heat treatment period before removing the material from the press or the autoclave.

*Example 1*

Finely divided lignocellulose containing only its normal moisture content of approximately 6% by weight was mixed with 20% by weight of the lignocellulose of 37% formaldehyde in water solution. Based on the weight of the lignocellulose the formaldehyde added was approximately 7.4%. The mixture was ball-milled for approximately ½ hour to uniformly distribute the formaldehyde throughout the mass. The blend was then placed in a heated autoclave, and steam was admitted until the pressure was 300 pounds per square inch and temperature was 425° F. The mixture was held under these conditions for 20 minutes and the interior of the autoclave was then vented. The reacting mixture was removed from the autoclave, and all particles which had consolidated were thoroughly broken up.

In a similar manner, lignocellulose was reacted with formaldehyde alone and in conjunction with a number of other additives. The following table sets forth the compositions, and the autoclave conditions under which these reactions were run.

| Example | Percent Formaldehyde | Percent Additive | Autoclave | | |
|---|---|---|---|---|---|
| | | | Time, Min. | Temp., °F. | Press., p.s.i. |
| 2 | 7.4 | None | 30 | 440 | 300 |
| 3 | 7.4 | ¼% Sulfuric Acid+½% Oxalic Acid. | 20 | 440 | 300 |
| 4 | 7.4 | 5% Ammonium Hydroxide. | 20 | 440 | 300 |
| 5 | 7.4 | 15% Vinsol+5% Ammonium Hydroxide. | 30 | 440 | 300 |
| 6 | 3.7 | 10% Cresol+5% Ammonium Hydroxide. | 30 | 440 | 300 |
| 7 | 3.7 | 15% Vinsol | 35 | 440 | 300 |
| 8 | 3.7 | 12% Sulfur+15% Vinsol. | 30 | 440 | 300 |
| 9 | ¹3.0 | 5% Phenol Residue+1% Sodium Hydroxide. | 30 | 440 | 300 |
| 10 | 5.0 | 5 p.s.i. Sulfur Dioxide | 20 | 440 | 300 |
| 11 | 5.0 | 1% Aluminum Chloride. | 10 | 400 | 200 |
| 12 | 5.0 | 1% Ferric Chloride | 25 | 440 | 300 |
| 13 | 5.0 | 1% Phosphoric Acid | 25 | 400 | 200 |
| 14 | 5.0 | 5% Vinsol+3% Calcium Chloride | 20 | 440 | 300 |

¹ Paraformaldehyde

All percentages given herein are by weight of the lignocellulose.

Where solid materials such as Vinsol, sulfur, or phenol residue are reacted with the lignocellulose in conjunction with formaldehyde, they are preferably very finely divided, and are thoroughly blended with the lignocellulose in a mixing device prior to the addition of the formaldehyde. Phenol residue is the condensation product of phenol with acetone and alpha-methylstyrene.

When inorganic salts, acids, or alkalies are used, they are preferably added as an aqueous solution, in an amount up to 20% of the weight of the lignocellulose. The solution concentration, of course, depends upon the desired quantity of additive for the particular reaction. Where such materials do not react with the formaldehyde, they can be added to the formaldehyde solution without prior dilution or solution and simultaneously blended with the lignocellulose.

Where gases such as sulfur dioxide or ammonia are utilized, the lignocellulose mixture is placed in the autoclave, the autoclave is evacuated to remove air, and it is then filled with the gas to the desired pressure. The formaldehyde may be used as a gas, solid or in liquid form as in aqueous solutions. It may also be supplied by a material capable of releasing formaldehyde.

Having described my invention as related to the embodiments set out herein, it is my intention that the invention be not limited by any of the details of description unless otherwise specified, but rather be construed broadly within its spirit and scope as set out in the accompanying claims.

I claim:

1. The method of making a lignocellulose product, consisting essentially of: intimately mixing particles of lignocellulose with about 0.5–15% of formaldehyde by weight of the lignocellulose; and heating the resulting composition under confined pressure for between about 4–60 minutes and at between about 300–550° F. to combine chemically said formaldehyde with the lignocellulose.

2. The method of making a lignocellulose product, consisting essentially of: intimately mixing particles of lignocellulose with about 0.5–15% of formaldehyde by weight of the lignocellulose; and heating the resulting composition under confined pressure in an atmosphere of steam for between about 4–60 minutes and at between about 300–550° F. to combine chemically said formaldehyde with the lignocellulose.

3. A lignocellulose product prepared by the method of claim 1.

References Cited in the file of this patent

UNITED STATES PATENTS

| 2,440,789 | Vander Pyl | May 4, 1948 |
| 2,706,160 | Clab | Apr. 12, 1955 |

FOREIGN PATENTS

| 497,477 | Great Britain | Dec. 16, 1938 |